US006639906B1

United States Patent
Levin

(10) Patent No.: US 6,639,906 B1
(45) Date of Patent: Oct. 28, 2003

(54) MULTICHANNEL DEMODULATOR

(76) Inventor: Jeffrey A. Levin, 12549 Maestro Ct., San Diego, CA (US) 92130

( * ) Notice: Subject to any disclaimer, the term of this patent is extended or adjusted under 35 U.S.C. 154(b) by 0 days.

(21) Appl. No.: 08/987,172

(22) Filed: Dec. 9, 1997

(51) Int. Cl.[7] .............................................. H04J 13/00
(52) U.S. Cl. ........................ 370/342; 370/335; 370/441; 375/206; 375/208
(58) Field of Search ................................. 370/209, 328, 370/332, 335, 342, 350, 441, 519; 375/200, 206, 208, 356, 367; 455/126, 127, 456

(56) References Cited

U.S. PATENT DOCUMENTS

| | | | | |
|---|---|---|---|---|
| 5,109,390 A | * | 4/1992 | Gilhousen et al. | 370/342 |
| 5,654,979 A | | 8/1997 | Levin et al. | 375/206 |
| 5,680,395 A | * | 10/1997 | Weaver, Jr. et al. | 375/206 |
| 5,867,527 A | * | 2/1999 | Ziv et al. | 375/208 |
| 5,881,058 A | * | 3/1999 | Chen | 370/342 |

FOREIGN PATENT DOCUMENTS

| EP | 0690588 | 6/1995 | ........... H04B/7/005 |
|---|---|---|---|
| EP | 0794623 | 3/1997 | ........... H04B/1/707 |
| WO | 9610873 | 4/1996 | ............ H04B/7/26 |

* cited by examiner

*Primary Examiner*—Douglas W. Olms
*Assistant Examiner*—Shick Hom
(74) *Attorney, Agent, or Firm*—Philip R. Wadsworth; Charles D. Brown; Christopher O. Edwards

(57) ABSTRACT

A system and method for performing the digital receive processing for multiple signals received over the same RF band is described. In a preferred embodiment of the invention, digital RF samples are stored in a queue which is accessed by a searcher and demodulator. The searcher and demodulator are preferably located on the same integrated circuit along with the queue. The demodulator demodulates a set of reverse link signals stored within the queue where each reverse link signal is received with at a particular time offset and processed using a particular channel code. The searcher periodically searches for reverse link signals not being processed by the demodulator, and for access requests transmitted via the access channel. The searcher preferably searches during the worthy power control groups of each reverse link signal, which corresponds to the two of sixteen power control groups transmitted during, an eighth rate frame.

18 Claims, 14 Drawing Sheets

FIG. 2 "PRIOR ART"

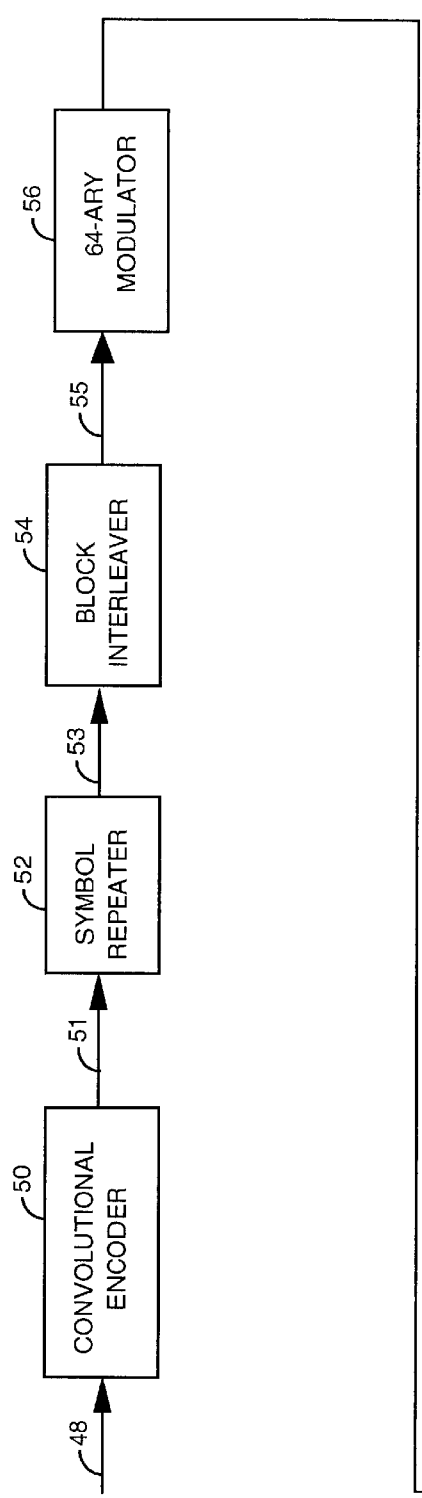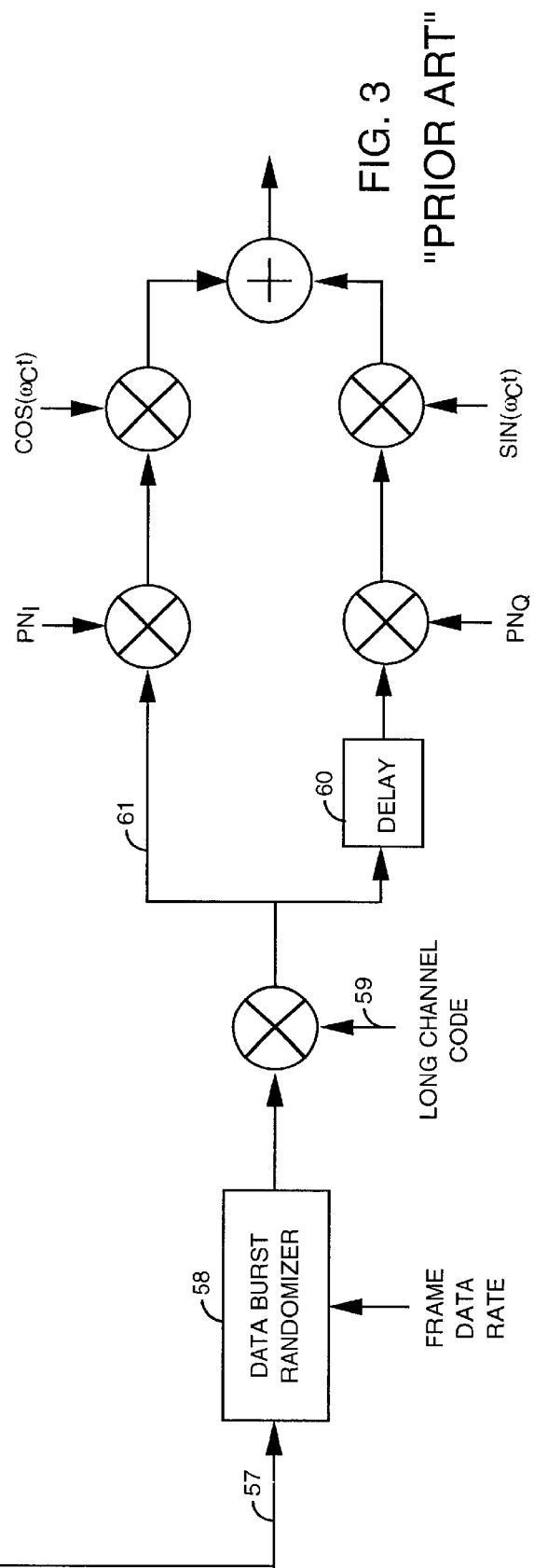
FIG. 3
"PRIOR ART"

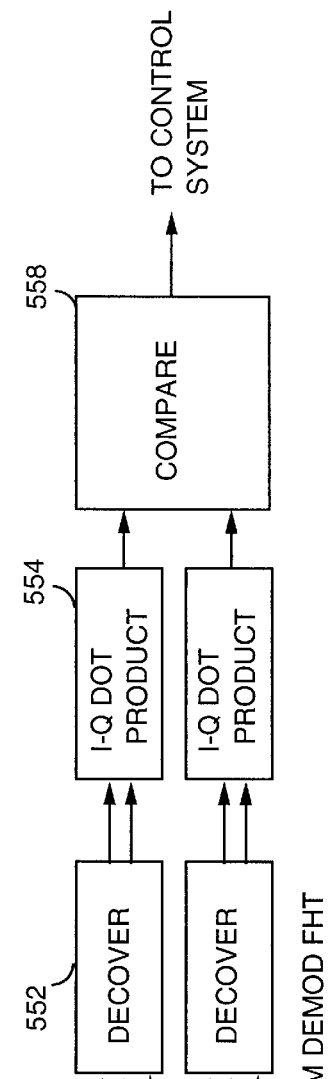
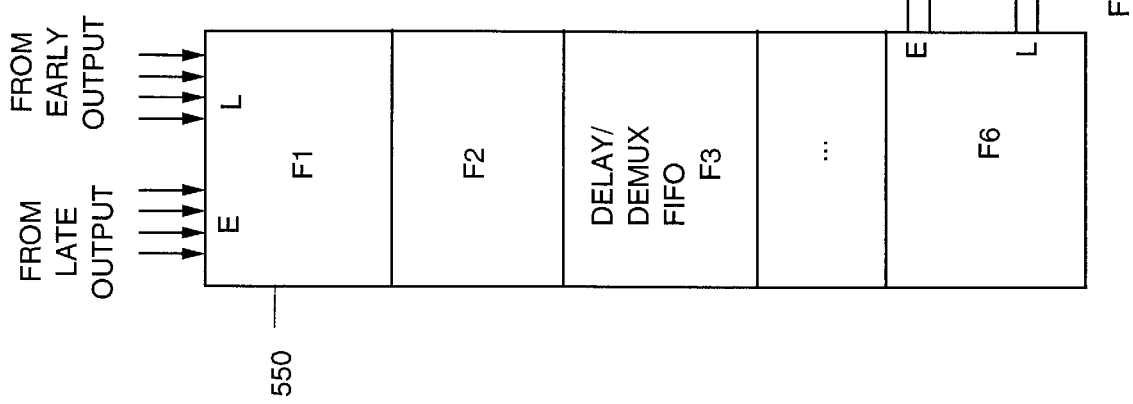
FIG. 14

MULTICHANNEL DEMODULATOR

BACKGROUND OF THE INVENTION

I. Field of the Invention

The present invention relates to digital wireless communications. More particularly, the present invention relates to a novel and improved demodulator for processing a set of user signals that facilitates implementation on a single integrated circuit.

II. Description of the Related Art

FIG. 1 is a block diagram of a highly simplified cellular telephone configured in accordance with the use of a Code Division Multiple Access (CDMA) over-the-air interface. In particular, FIG. 1 illustrates a cellular telephone system configured in accordance with the use of the IS-95 standard, which uses CDMA signal processing techniques to provide highly efficient and robust cellular telephone service. IS-95, and its derivatives such as IS-95A and ANSI J-STD-008 (referred to herein collectively as IS-95), are promulgated by the Telecommunication Industry Association (TIA) as well as other well known standards bodies. Additionally, a cellular telephone system configured substantially in accordance with the use of IS-95 is described in U.S. Pat. No. 5,103,459 entitled "System and Method for Generating Signal Waveforms in a CDMA Cellular Telephone System" assigned to the assignee of the present invention and incorporated herein by reference.

A primary benefit of using a CDMA over-the-air interface is that communications are conducted over the same RF band. For example, each mobile unit 10 (typically cellular telephones) shown in FIG. 1 can communicate with a same base station 12 by transmitting a reverse link signal over the same 1.25 MHz of RF spectrum. Similarly, each base station 12 can communicate with mobile units 10 by transmitting a forward link signal over another 1.25 MHz of RF spectrum. Transmitting signals over the same RF spectrum provides various benefits including an increase in the frequency reuse of a cellular telephone system, and the ability to conduct soft handoff between two or more base stations. Increased frequency reuse allows a greater number of calls to be conducted over a given amount of spectrum. Soft handoff is a robust method of transitioning a mobile unit from the coverage area of two or more base stations that involves simultaneously interfacing with two base stations. Soft handoff can be contrasted with hard handoff where the interface with a first base station is terminated before an interface with a second base station is established.

During typical operation of the cellular telephone system of FIG. 1, a base station 12 receives a set of reverse link signals from a set of mobile units 10. The mobile units 10 are conducting telephone calls or other communications. Each reverse link signal is processed within base stations 12, and the resulting data forwarded to base station controller (BSC) 14. BSC 14 provides call resource allocation and mobility management functionality including the orchestration of soft handoffs between base stations. BSC 14 also routes the data received to mobile switching center (MSC), which provides additional routing services for interface with the conventional public switch telephone system (PSTN).

A portion of a prior art base station configured to processing a set of reverse link signals from a set of mobile units 10 is shown in FIG. 2. During operation, antenna system 40 receives a set of reverse link signals transmitted in the same RF band from the set of mobile units 10 in the associated coverage area. RF receiver 42 downconverts and digitizes the set of reverse link signals yielding digital samples that are received by cell site modems (CSMs) 44. Each CSM 44 is allocated by controller 46 to processes a particular reverse link signal from a particular mobile unit 10, and each generates digital data that is forwarded to BSC 14. A system and method for implementing each CSM on a single integrated circuit is described in U.S. Pat. No. 5,654,979 entitled "Cell Site Demodulator Architecture for a Spread Spectrum Multiple Access Communication System" and copending U.S. application Ser. No. 08/316,177 entitled "Multipath Search Processor For A Spread Spectrum Multiple Access Communication System," both assigned to the assignee of the present invention and incorporated herein.

In general, a base station must be capable of interfacing with between sixteen and sixty-four mobile units simultaneously in order to provide adequate capacity for a typical urban appellation. This in turn, requires each base station 12 to contain between 16 and 64 CSMs. While base stations using between 16 and 64 CSMs have been implemented and deployed on a wide scale, the cost of such base stations is relatively high. One of the main causes of this cost is the complex and somewhat sensitive interconnects from the RF unit to the various CSMs, and the interconnects between the base stations controllers and the CSMs. Typically, a subset of twenty-four (24) to thirty-twotwenty-six (3226) or so CSMs are placed on a circuit board, and a set of circuit boards are coupled via a backplane, which in turn is coupled to an RF unit using sets of coaxial cables. Such interconnecting is expensive, and somewhat unreliable, and contributes substantially to the overall cost, complexity and maintenance of a base station 12. Therefore, such a configuration is highly undesirable. The present invention is directed to a method and apparatus for processing a set of reverse link signals received from a set of mobile units without the need for a large set of cell site modems.

FIG. 3 is a block diagram illustrating the signal processing used to transmit a single reverse link traffic channel in accordance with the IS-95 standard provided to facilitate understanding of the invention. Data 48 being transmitted is provided to convolutional encoder 50 in 20 ms segments, called frames, at one of four rates referred to as "full rate", "half rate", "quarter rate", and "eighth rate" respectively, as each frame contains half as much data as the previous and therefore transmits data at half the rate. Data 48 is typically variable rate vocoded audio information where lower rate frames are used when less information is present, such as during a pause in a conversation. Convolution encoder 50 convolutionally encodes data 48 producing encoded symbols 51, and symbol repeater 52 generates repeated symbols 53 by symbol repeating encoded symbols 51 by an amount sufficient to generate a quantity of data equivalent to a full rate frame. For example, three additional copies of a quarter rate frames are generated for a total of four copies while no additional copies of a full rate frame are generated.

Block interleaver 54 then block interleaves the repeated symbols 53 to generate interleaved symbols 55. Modulator 56 performs 64-ary modulation on interleaved symbols 55 to produce Walsh symbols 57. That is, one of sixty-four possible orthogonal Walsh codes, each code consisting of sixty-four modulation chips, is transmitted for every six interleaved symbols 55. Data burst randomizer 58 performs gating, using frame rate information, on Walsh symbols 57 in pseudorandom bursts such that only one complete instance of the data is transmitted. The gating is performed in increments of six Walsh symbols referred to as "power control groups," because a power control command is generated at the base station every corresponding period. Sixteen power control groups occur for each 20 ms frame, with all sixteen being transmitted for a full rate frame, eight for a half rate frame, four for a quarter rate frame and two for an eighth rate frame. For each lower rate frame the power control groups transmitted are a subset of the groups transmitted for a higher rate frame.

The gated Walsh chips are then direct sequence modulated using a pseudorandom (PN) long channel code 59 at rate of four long channel code chips to each Walsh chip generating modulated data 61. The long channel code is unique for each mobile unit 10 and is known by each base station 12. Modulated data 61 is duplicated with the first copy being "spread" via modulation with an in-phase pseudorandom spreading code ($PN_I$) producing I-channel data, and the second copy is delayed one half a spreading code chip by delay 60 and spread via modulation with a quadrature-phase pseudorandom spreading code ($PN_Q$) producing Q-channel data. The $PN_I$ and $PN_Q$ spread data sets are each low pass filtered (not shown), before being used to modulate in-phase and quadrature-phase carrier signals respectively. The modulated in-phase and quadrature-phase carrier signals are summed together before transmitted to a base station or other receive system (not shown).

SUMMARY OF THE INVENTION

The present invention is a novel and improved system and method for performing the digital receive processing for multiple signals received over the same RF band. In a preferred embodiment of the invention, digital RF samples are stored in a RAM queue which is accessed by a searcher and a demodulator. The searcher and demodulator are preferably located on the same integrated circuit along with the RAM queue. The demodulator demodulates a set of reverse link signals stored within the RAM queue where each reverse link signal is received at a particular time offset and processed using a particular channel code. The searcher periodically searches for reverse link signals not being processed by the demodulator, and for access requests transmitted via the access channel. The searcher preferably searches during the worthy power control groups of each reverse link signal, which corresponds to the two of sixteen power control groups transmitted during a eighth rate frame.

BRIEF DESCRIPTION OF THE DRAWINGS

The features, objects, and advantages of the present invention Will become more apparent from the detailed description set forth below when taken in conjunction with the drawings in which like reference characters identify correspondingly throughout and wherein:

FIG. 3 is a block diagram of a transmit system used to generate an IS-95 reverse link signal;

FIG. 14 is a block diagram of a time the tracking unit when configured in accordance with one embodiment of the invention.

DETAILED DESCRIPTION OF THE PREFERRED EMBODIMENTS

A system and method for demodulating a set of signals is described in the context of a wireless digital cellular telephone system. In the preferred embodiment, the receive digital processing is performed on up to sixty-four users, and is substantially implemented using a single integrated circuit. While such a configuration is preferred, and the invention is particularly well suited for such a configuration, the invention may also be employed in other configurations, including satellite based communication systems and wireline communications systems, and systems in which the digital signal processing is performed using a plurality of integrated circuits.

Figure 1:
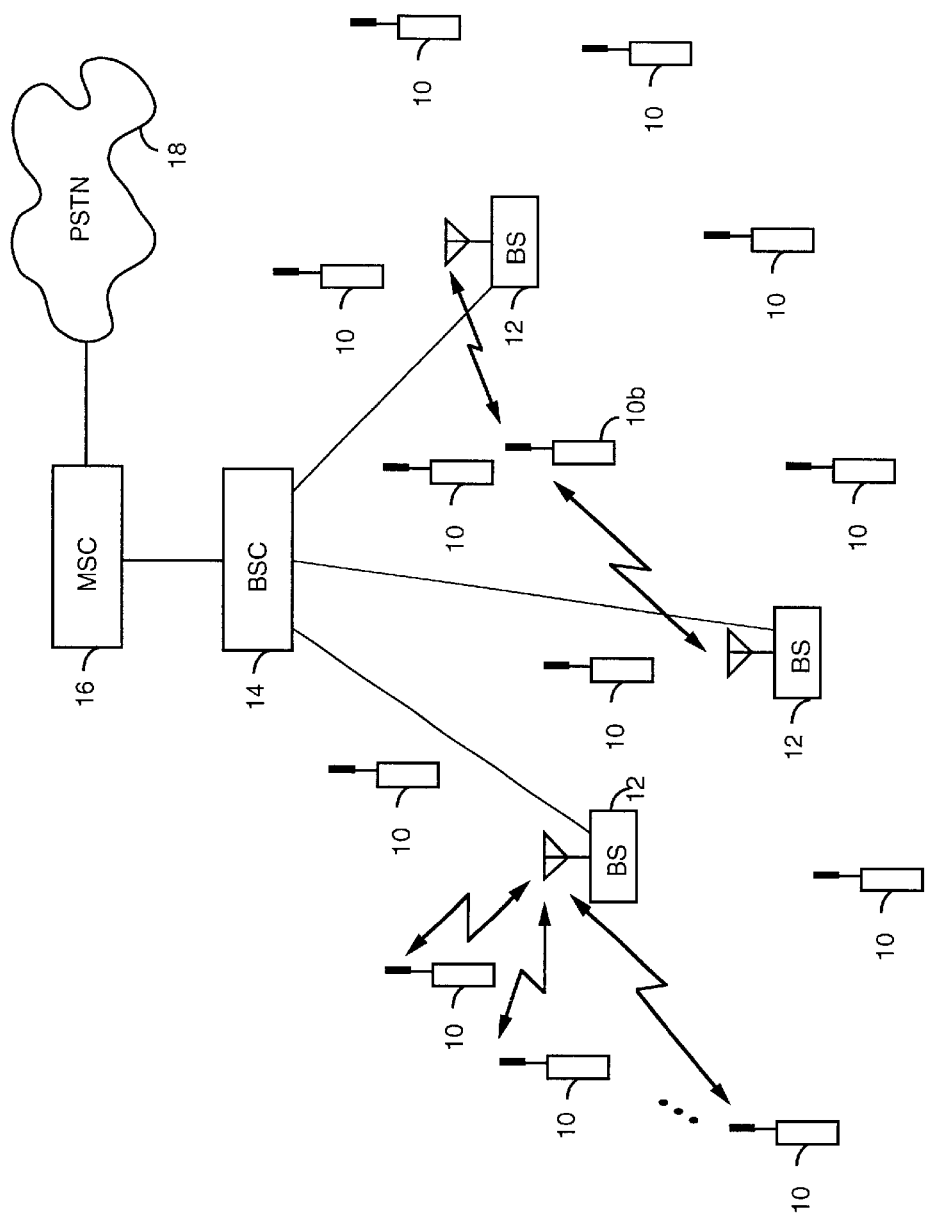
FIG. 1 is a block diagram of a cellular telephone system.
Figure 2:
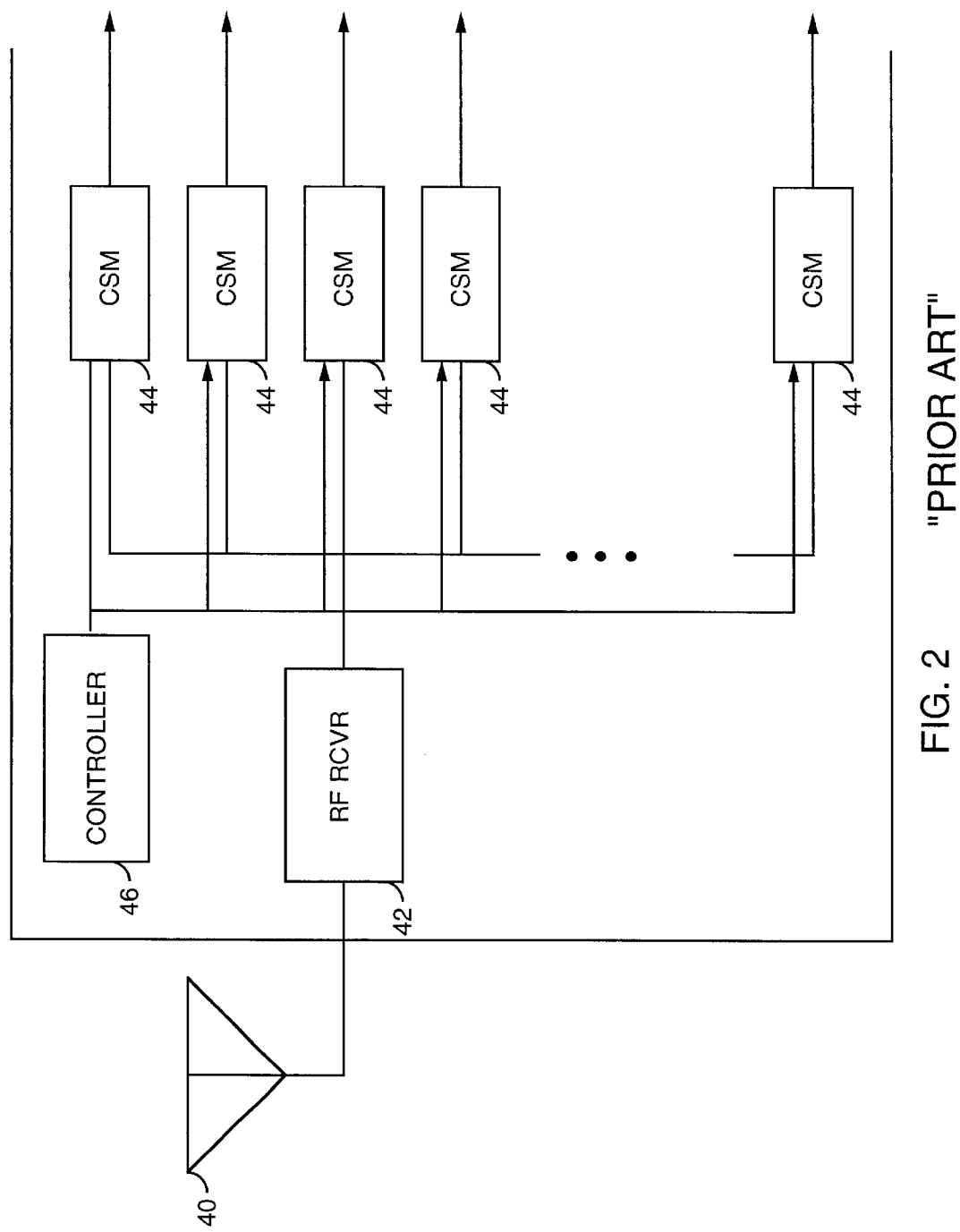
FIG. 2 is a block diagram of a portion of a base station configured in accordance with the prior art.
Figure 4:
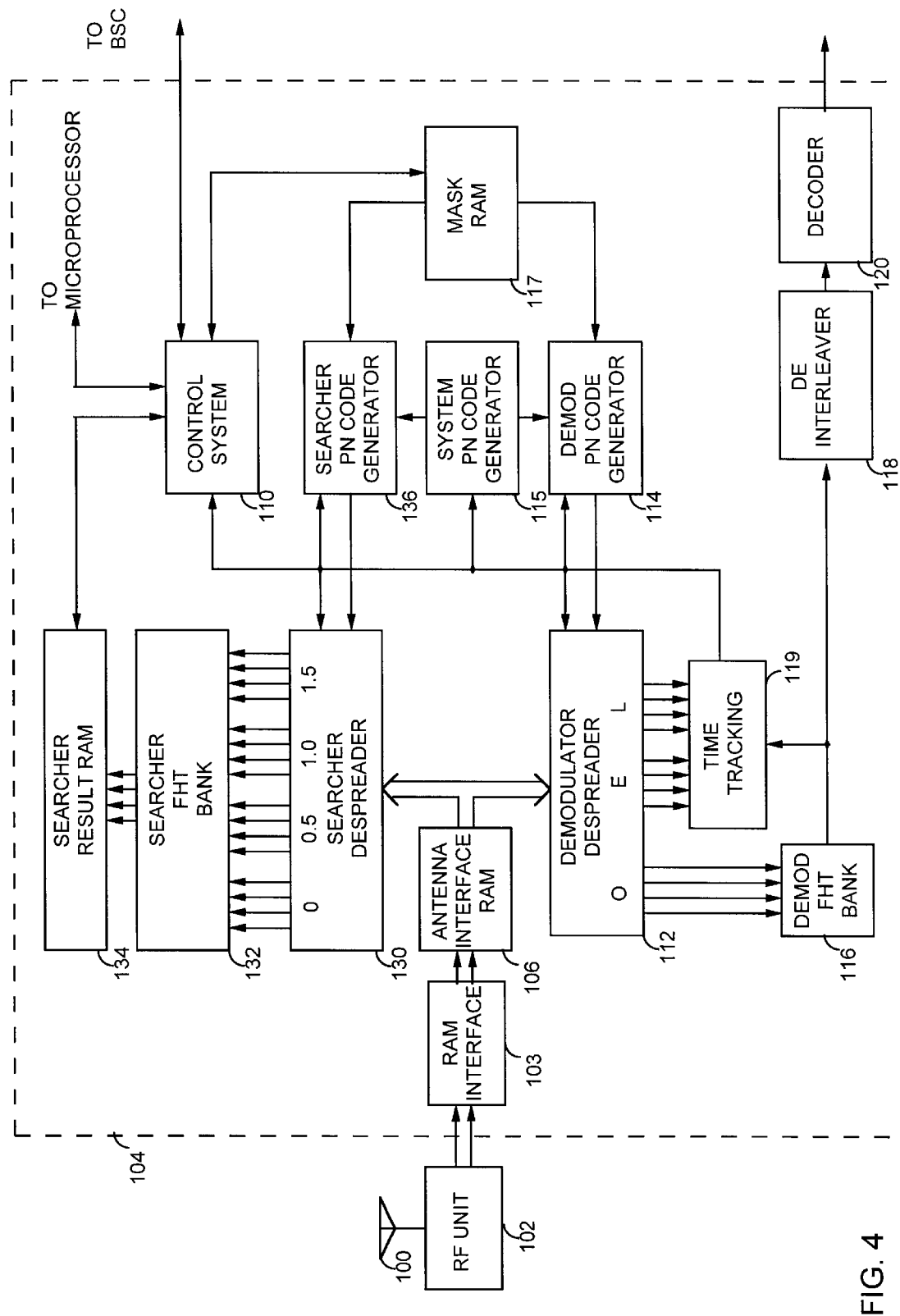
FIG. 4 is a block diagram of a portion of the receive processing system of a base station when configured in accordance with one embodiment of the invention.

FIG. 4 is a block diagram of a receive processing system configured in accordance with one embodiment of the invention. In a preferred embodiment of the invention, the receive processing system of FIG. 4 is located within a base station 12 of a cellular telephone system. As shown, the receive processing system is comprised of an RF receiver 102 coupled to an antenna system 100 and a digital processing system 104. Digital processing system 104 is preferably located on a single integrated circuit, which is made possible by the configuration and operation of the digital system described herein. Digital processing system 104 exchanges control data with an external control system preferably comprised of a microprocessor running software stored in memory (not shown). Additionally, digital processing system 104 generates receive data that is transmitted to base station controller 14 of FIG. 1 for further processing and routing to its ultimate destination. Also, multiple RF units may interface with digital processing system 104 corresponding to, for example, different antennas or sectors in a base station.

During operation, receiver 102 receives RF energy including a set of reverse link signals from mobile units along with any background noise and interference via antenna system 100. Receiver 102 filters, downconverts and digitizes a 1.25 MHz band of the RF energy that includes the set of reverse link signals, and provides the digitized samples to digital processing system 104. Preferably, the digitized samples are provided at two (2) times the spreading chip rate, which is 1.2288 Megachips per second (Mcps), for a sample rate of approximately 2.5 MHz. Receiver 102 generates both in-phase and quadrature-phase samples by mixing with an in-phase sinusoid (SIN) and a quadrature phase sinusoid (COS) during downconversion the technique of which is well known in the art. The samples preferably have a resolution of 4 bits.

Within digital processing system 104 digital samples are received by RAM interface 103 which stores the 2×samples in antenna interface (AI) circular buffer RAM 106. Circular buffer RAM 106 may be any type of memory system including static RAM. The decimation is performed to reduce the required size of circular buffer RAM while still providing acceptable resolution sufficient to detect and track particular reverse link signals within a set of reverse link signals and other background noise. Circular buffer RAM preferably stores four (4) Walsh symbols worth of both in-phase and quadrature-phase 2×samples at any given time, which corresponds to 2,048 in-phase samples and 2,048 quadrature phase samples (4 Walsh symbols * 64 Walsh chips/symbol * 4 spreading chips/Walsh chip * 2 samples/ spreading chip.) Since each sample is 4 bits, the total memory required in the described embodiment is 2,048 Kbytes.

Under the control of control system 110, and using pseudo random noise codes from demod PN code generator 114, demodulator 112 retrieves samples from circular buffer RAM 106 and despreads a set of reverse link signals stored therein. As noted above, in accordance with CDMA techniques, each reverse link signal is modulated and demodulated with a set of PN codes that is unique for each mobile unit 10. For the IS-95 reverse link, the set of PN codes includes an in-phase PN code (PNI) for the in-phase data, a quadrature-phase PN code (PNQ) for the quadrature-phase data, and a user code (PNU) which is used to modulate both the in-phase and quadrature-phase signals. The portion of the set of PN codes for each reverse link signal demodulated is provided by demod PN code generator 114.

In accordance with the IS-95 standard, the state of the PN codes used during modulation depends on a system time known and tracked by each base station, preferably using GPS (Global Positioning System) receivers, and provided to each mobile unit 10 via the pilot channel and synchronization channels. The mobile unit 10 transmits the reverse link signal using the PN codes set based on the system time provided from the base station. The base stations receive the reverse link signals after some transmission delay with the state of the reverse link PN codes used to process the signal offset by that transmission delay with respect to system time at the base station.

Each offset is generally different for each subscriber unit as they are located a different distance from the base station 12. Reverse link signals are identified by their offset as well the user code (PNU) of mobile unit 10 from which they are generated. The user code can be determined from the MOBILE ID or ESN of the mobile unit 10. Thus, signals received from a particular mobile unit 10 can be referenced by providing the mobile unit 10 ESN and the offset at which the signals are received. Multiple occurrences of a signal from the same mobile unit 10 are typically generated via reflection and other multipath phenomenon, where the paths are different length. Preferably, demodulator 112 demodulates at offsets for which signals have been detected, and the demodulation is performed continuously at those offsets until the communication is terminated, or the signal is not longer detected.

During operation, demodulator 112 outputs data for each reverse link signal processed at the offsets specified by control system 110 (labeled "O" for "on time" data). Additionally, demodulator 112 outputs signals processed ½ the duration of a spreading chip before the offsets specified (labeled "E" for early), and processed one-half (½) the duration of a spreading chip after the offsets specified (label "L" for late). In the preferred embodiment of the invention, four outputs are generated for each offset, with the four outputs corresponding to even and odd versions of both the in-phase and quadrature-phase data. Even and odd versions are merely alternating portions of the data received, with the separate versions provided in order to facilitate processing by demod FHT bank 116 described in greater detail below.

Demod FHT bank 116 receives the on-time despread data from demodulator 112 and performs a fast Hadamard transform on both the in-phase and quadrature phase data from each generating on-time soft decision data. Early and late demodulation data is provided to time tracking system 119, which stores the data while the on-time demodulation data is processed further. On-time soft decision data is provided to deinterleaver 118. Deinterleaver 118 deinterleaves the soft decision data received for each reverse link signal in 20 ms blocks, and the deinterleaved soft decision data is provided to decoder 120. Decoder 120 preferably performs trellis or Viterbi decoding to yield hard decision data 122 forwarded to base station controller 14 of FIG. 1.

Time tracking system 119 receives the early and late despread data as well as combined on-time soft decision data and decovers the despread data using the Walsh symbol indicated as most likely by the combined soft decision data. If the decovered early soft decision data contains more energy, time tracking system 119 decrementsincrements, or advances, a timing offset residue buffer associated with multipath instance of the reverse link signal (finger) being processed by a fraction of a PN chip. In particular, the timing offset residue buffer is offset by an amount proportional to the magnitude difference of the two energy levels. If the decovered late soft decision data contains more energy, time tracking system 119 incrementdecrements, or retards, the timing offset residue buffer associated with finger is being processed by that same fraction of a PN chip.

When the amount stored in the timing offset buffer by which the processing is advanced or retarded reaches one-eighth (⅛) the duration of a PN spreading chip, the actual offset at which the particular reverse link signal is processed is incremented or decremented by one-eighth (⅛) the duration of a PN spreading chip. In the preferred embodiment of the invention, the amount by which the timing offset buffer is incremented is one-two thousandth (1/204800) the duration of a spreading chip for each sixteen spreading chips demodulated, although the use of other increment amounts is consistent with the use of the present invention.

Simultaneous with the processing performed by demodulator 112, searcher 130 retrieves samples from circular buffer RAM 106 under the control of control system 110. In particular, control system 110 instructs searcher 130 to retrieve particular portions of the samples stored in circular buffer RAM 106, and to perform a set of time offset demodulations using the set of spreading codes for a particular mobile unit 10 to determine if a reverse link signal is from that mobile is being received at that time. Preferably, searcher 130 demodulates at offsets for which reverse link signals are not signals that are not currently being demodulated by demodulator 112 in order to detect new reverse link signals. The demodulations are preferably performed in sets of four which correspond to a zero offset demodulation (labeled "0"), a 0.5 spreading chip offset (labeled "0.5"), a 1 spreading chip offset (labeled "1"), and a 1.5 spreading chip offset (labeled "1.5"). The PN codes used to perform the demodulations are generated by searcher PN code generator 136 under the control of control system 110.

The results of the four demodulations are forwarded to searcher FHT bank 132 which performs fast Hadamard transforms on each demodulation, and accumulates the results over 6 Walsh symbols or a power control group. The resulting soft decision energy levels from searcher FHT bank 132 are stored in searcher results RAM 134. Control system 110 accesses searcher result RAM 134 and if energy levels are detected above various thresholds instructs demodulator 112 to begin processing at the associated time offset.

In accordance with one embodiment of the invention, digital processing system 104 is configured to simultaneously processes 256 reverse link signals which can be generated by, or transmitted from up to eighty (80) different mobile units 10. Additionally, up to six (6) multipath instances (fingers) of a particular reverse link signal may be processed at any given time. Since the total number of reverse link signals processed can not exceed two-hundred fifty-six (256), however, the number of multipath instances that can be processed for any particular reverse link signal is typicallymay be less than six depending on the total number of reverse link signal being processed and the number of multipath instances being received for each reverse link signal. Allowing up to 80 different reverse link signals to be processed along with up to six (6) multipath instances of each reverse link signal provides enhanced flexibility in that the system may be configured to process many multipath instances for a smaller set of reverse link signals, which is preferred for highly irregular terrain, or to process fewer multipath instances of many reverse link signals, which is preferred for more regular terrain.

Additionally, the ability to processing 6 instances of 80 different reverse link signals allows a single digital processing system 104 to perform the signal processing necessary for a three sector base station having twenty (20) mobile units 10 per sector. A three section base station 12 having twenty mobile units per sector is a common configuration in the industry, and therefore a digital processing system 104 capable of implementing such a base station 12, particularly on a single integrated circuit, is highly desirable.

To simultaneously process 256 signals, digital processing system 104 operates at a clock rate thirty-two (32) times that of the PN spreading code chip rate (chip×32), or approximately 40 MHz. At this clock rate, demodulator 112 can allocate 32 clock cycles to each of the 256 signals being processed. Similarly, searcher 130 can perform two-hundred and fifty-sixthirty-two (25632) search operations of four offsets per operation giving it a throughput of 1024 paths searched during each power control group. Searcher 130 performs 32 demodulation operations for each set of new PN spreading code chips received. Additionally, during each clock cycle searcher 130 receives 16 PN code spreading chips for a particular mobile unit from searcher PN spreading code generator 136, and demodulator 112 receive 16 PN spreading code chips for a particular mobile unit from demodulator PN spreading code generator 114. Thus, demodulator 112 performs sixteenthirty-two (32) desreading demodulation operations (despread) (demods), each involving 16 PN spreading code chips per despreaddemod, for each set of new spreading codes received from the sixty-four mobile units. Searcher 130 also performs sixteen despreadsthirty-two (32) demods, each involving 16 PN spreading codes at set of four chip offsets 0, 0.5, 1.0, 1.5.

Both demodulator PN code generator 114 and searcher PN code generator 136 receive system codes from system PN code generator 114 and MASK values from mask RAM 117. During each Walsh symbol, system PN code generator 114 provides 72 bits of system PN code data to both demodulator PN code generator 114 and searcher PN code generator 136 under the control of control system 110. In particular, system PN code generator 114 generates the system code at various states that correspond to the time offset at which the various reverse link signals are being received. Thus, demodulator 112 demodulates a set of reverse link signals using the PN codes supplied by demod PN code generator 114 and searcher 130 demodulates a set of reverse link signals using the PN codes supplied by searcher PN code generator 136.

Figure 5:
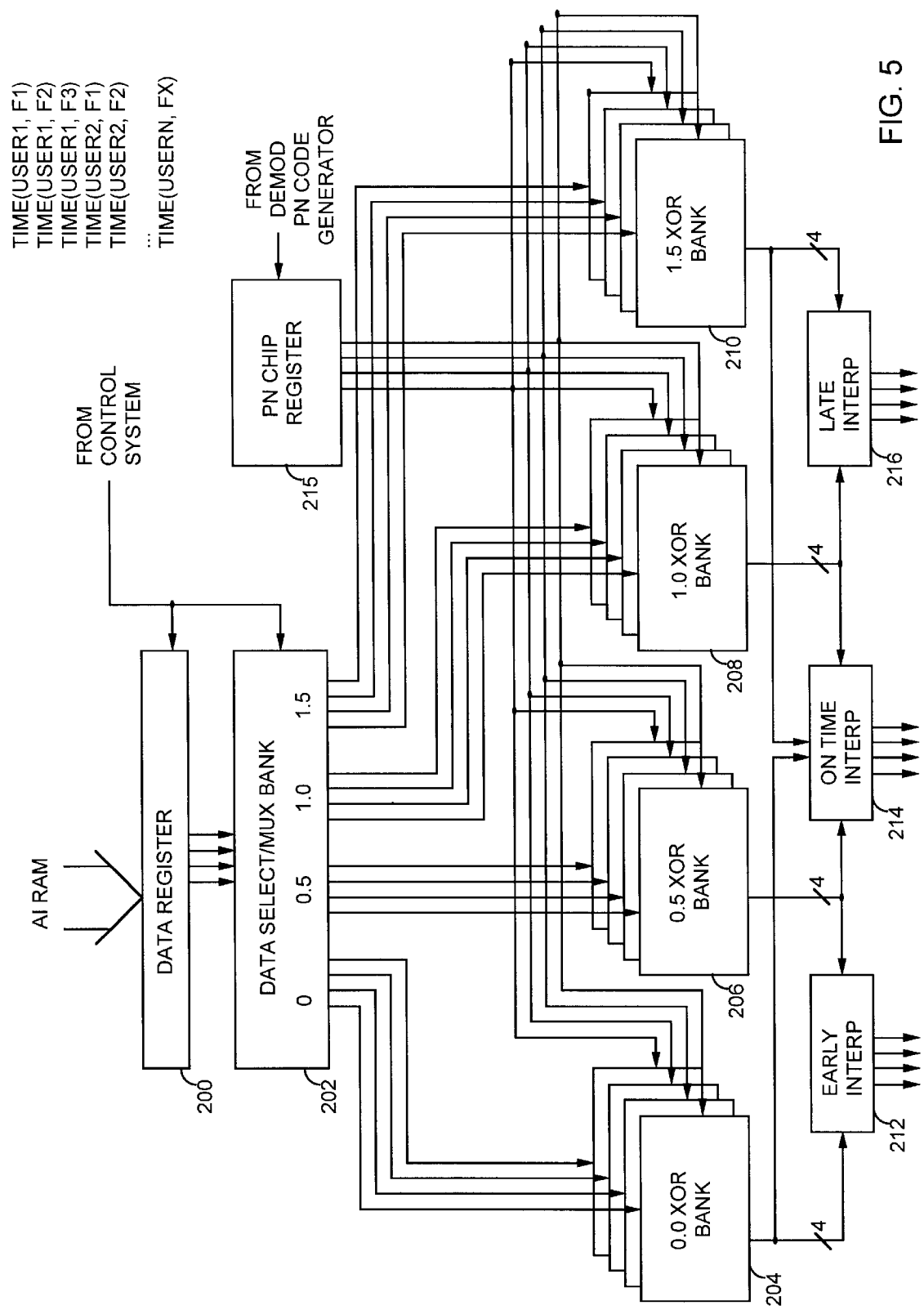
FIG. 5 is a block diagram of the demodulator when configured in accordance with one embodiment of the invention.

FIG. 5 is a block diagram of demodulator 112 when configured in accordance with one embodiment of the invention. Data register 200 retrieves blocks of digital samples from circular buffer RAM 106 under the control of control system 110. Control system 110 specifies the blocks of data to be retrieved within circular buffer RAM based on the offset of the reverse link signal being processed at that particular time, as described in greater detail below. Data select/mux bank (data select) 202 the correct offset of the 2×data samples based on the offset information from control system 110 by shifting the data, and applies the time offset data to XOR banks 204–210. The samples are provided in even and odd portions of both the in-phase and quadrature-phase components, hence four lines are shown for most connections.

XOR banks 204–210 are comprised of four XOR sub-banks for processing the even and odd portions of both the in-phase and quadrature phase data. Each XOR bank receives the PN code being decovered and applies the PN code to the samples at offsets of ½ the duration of a spreading chip from one another yielding 0.0 chip offset despread data, 0.5 chips offset despread data, 1.0 chip offset despread data and 1.5 chip offset despread data. The PN code is received from demod PN code generator 114 of FIG. 4 and stored in PN chip register 215.

In a preferred embodiment of the invention, the PN code for a particular reverse link signal is provided, and then the set of up to four offsets for the four fingers of that reverse link signal are processed before the PN code for the next reverse link signal is latched into PN chip register 115. That is, the same PN code segment is used to demodulate up to four instances of a particular reverse link signal, with different instance being selected from different set of samples from circular buffer RAM 106. The different samples are retrieved by demodulator 112 in response to offset information from control system 110. By demodulating with the same PN code segment, the results from each finger can be more easily accumulated as described below.

The present invention facilitates use of the same PN code segment to demodulate different instances of the same reverse link signal by using circular buffer RAM 106 as a deskew buffer in which four Walsh symbols of signal information is stored until needed. By storing four Walsh symbols worth of samples makes it probable that the same portion of the reverse link signal will be simultaneously stored in the circular buffer RAM for each finger. This eliminates the need for using additional memory during combining of he fingers for a particular reverse link signal. Other embodiments of the invention may uses alternatives for aligning the data from different fingers of the same reverse link signals such as the introduction of delay.

Early interpolation circuit 212 receives 0.0 chip offset despread data and 0.5 chip offset despread data and calculates a value for a despread data offset by 0, 0.125 ⅛, 0.25 ¼, or 0.375 ⅜ of the duration of a chip before the current offset (early despread data) using interpolation. In particular, early interpolation circuit 212 calculates a value for despread data offset by 0.5 relative to one-time interpolation circuit 214. Early interpolation circuit 212 may also receive 1.0 and 1.5 chip offset data in alternative embodiments of the invention. In one embodiment of the invention simple linear interpolation is used, however, the use of other interpolation methods is consistent with the operation of the invention. For example, any seven tap FIR is appropriate.

Similarly, on-time interpolation circuit 214 receives both 0.5 chip offset despread data and 1.0 chip offset despread data, and calculates a value for on-time despread data at an offset of $0.5_{13}$, 0.625 ⅝, $0.75_{13}$ or 0.875 ⅞ using interpolation, depending of the current offset of the finger being processed.

Additionally, late interpolation circuit 216 receives both 1.0 chip offset despread data and 1.5 chip offset despread data, and calculates a value for despread data delayed by 1.01, 1.1251 ⅛, 1.251 ⅔ or 1.3751 ⅜ the duration of a spreading chip (late despread data) using interpolation. In particular, late interpolation circuit 216 calculates a value for despread data delayed 0.5 the duration of a spreading chip from on-time despread data, and a full chip from early despread data. In one embodiment of the invention, lLinear interpolation is also used to calculate a value for the delayed despread data., Ffor example, a 15 tap FIR is suitable. The early, late and on-time data are supplied to demod FHT bank 116 of FIG. 4.

Figure 6:
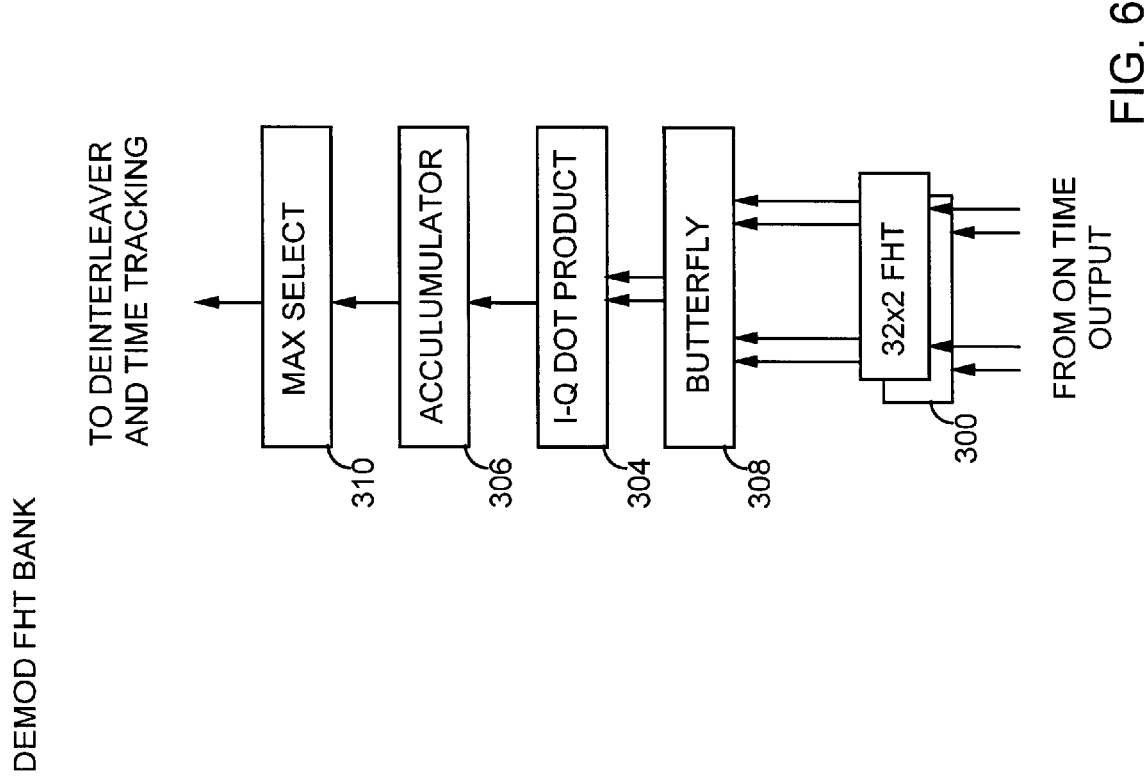
FIG. 6 is a block diagram of the demod FHT bank when configured in accordance with one embodiment of the invention.

FIG. 6 is a block diagram of demod FHT bank 116 when configured in accordance with one embodiment of the invention. 32×2 FHTs 300 receive on time despread data and perform fast Hadamard transforms on the in-phase (I) and quadrature-phase (Q) components. A system and method for performing a fast Hadamard transform is described in U.S. Pat. No. 5,561,618 entitled "Method and Apparatus for Performing a Fast Hadamard Transform" which is assigned to the assignee of the present invention and incorporated herein. The output of 32×2 FHTs 300 is processed by adder-subtractor butterfly combiner 308 which combines the output from the even and odd samples yielding a I correlation vector and a Q correlation vector. I-Q dot product 304 generates the dot product of the I and Q correlation vectors yielding a correlation energy vector that is forwarded to accumulator 306.

Accumulator 306 accumulates the energy correlation vectors from I-Q dot product 304 for a set of outputs that correspond to different instances (fingers) of the same reverse link signal. Accumulation of the correlation values for a set of fingers is facilitated by the storage of four Walsh symbols worth of samples within circular buffer RAM which allows the same PN code segment to be used to demodulate several instances of the same reverse link signal stored within circular buffer RAM 106.

Once the energy correlation values from all the fingers from a particular reverse link signal have been combined, the accumulated energy correlation vector is provided to max select 310, which selects the maximum correlation value from the correlation vector as the most likely to have been transmitted and generates a corresponding index value. A system and method for performing a max detect operation is described in U.S. Pat. No. 5,442.627 entitled "Noncoherent Receiver Employing a Dual-Maxima Metric Generation Process" assigned to the assignee of the present invention and incorporated herein. The output of max select 310 is forwarded to deinterleaver 140 of FIG. 4.

Figure 7:
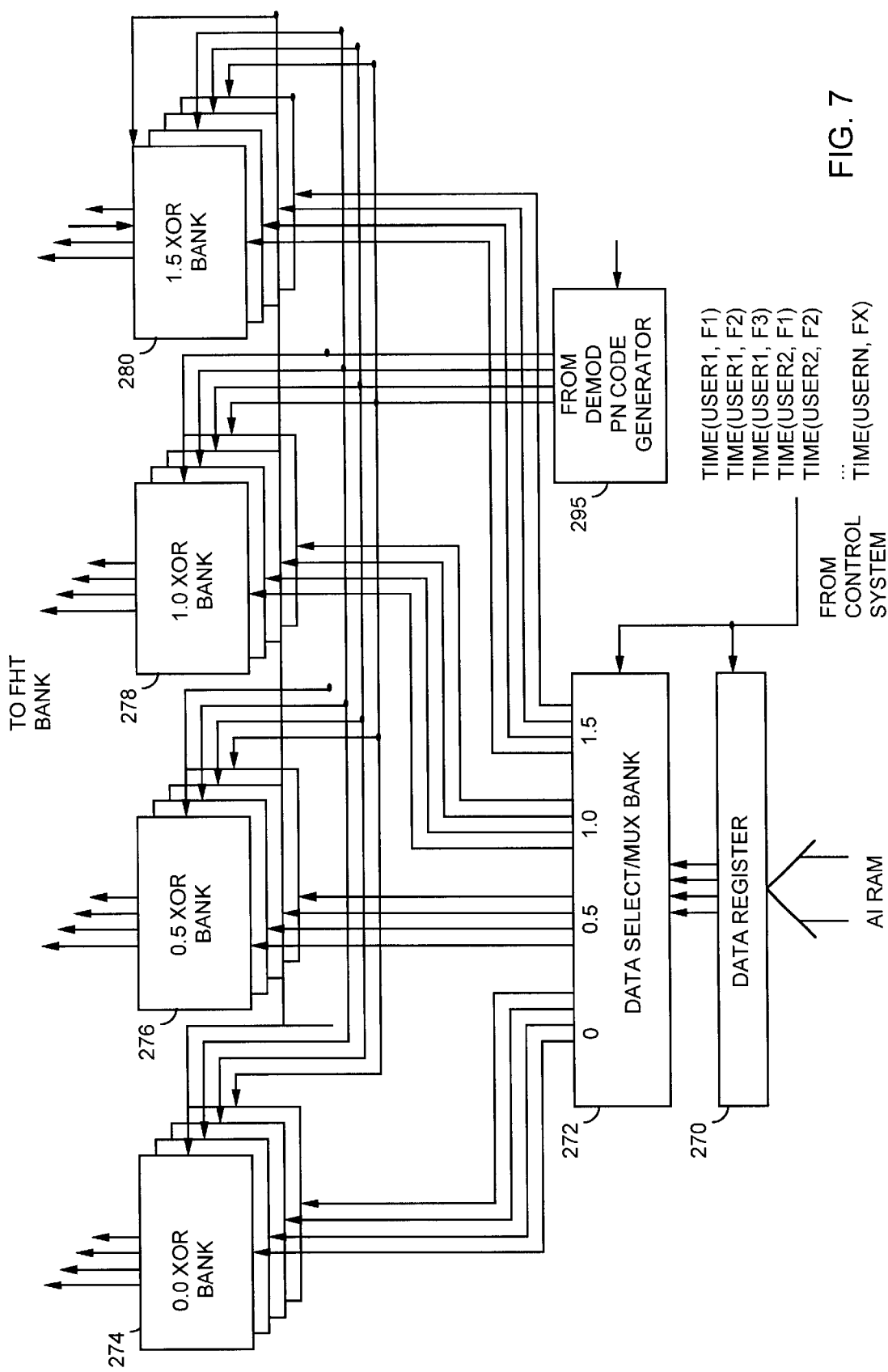
FIG. 7 is a block diagram of the searcher when configured in accordance with one embodiment of the invention.

FIG. 7 is a block diagram of searcher 130 when configured in accordance with one embodiment of the invention. Data register 270 retrieves blocks of digital samples from circular buffer RAM 106 under the control of control system 110. Control system 110 specifies the blocks of data to be retrieved within circular buffer RAM based on the offset of the reverse link signal being processed at that particular time as described in greater detail below. Data select/mux bank (data select) 272 adjusts the timing offset of the data being processed based on the offset information from control system 110, and applies the time offset data to XOR banks 274–280. The samples are provided in even and odd portions of both the in-phase and quadrature-phase components, hence four lines are shown for most connections.

XOR banks 274–280 are each comprised of four XOR subbanks for processing the even and odd portions of both the in-phase and quadrature phase data. Each XOR bank receives the PN code being demodulated and applies the PN code to the samples at offsets of ½ the duration of a spreading chip from one another yielding 0.0 chip offset despread data, 0.5 chips offset despread data, 1.0 chip offset despread data and 1.5 chip offset despread data. The PN code is received from searcher PN code generator 114 of FIG. 4 and stored in PN chip register 295. The chip offset despread data for the four offsets is forwarded to searcher FHT bank.

Figure 8:
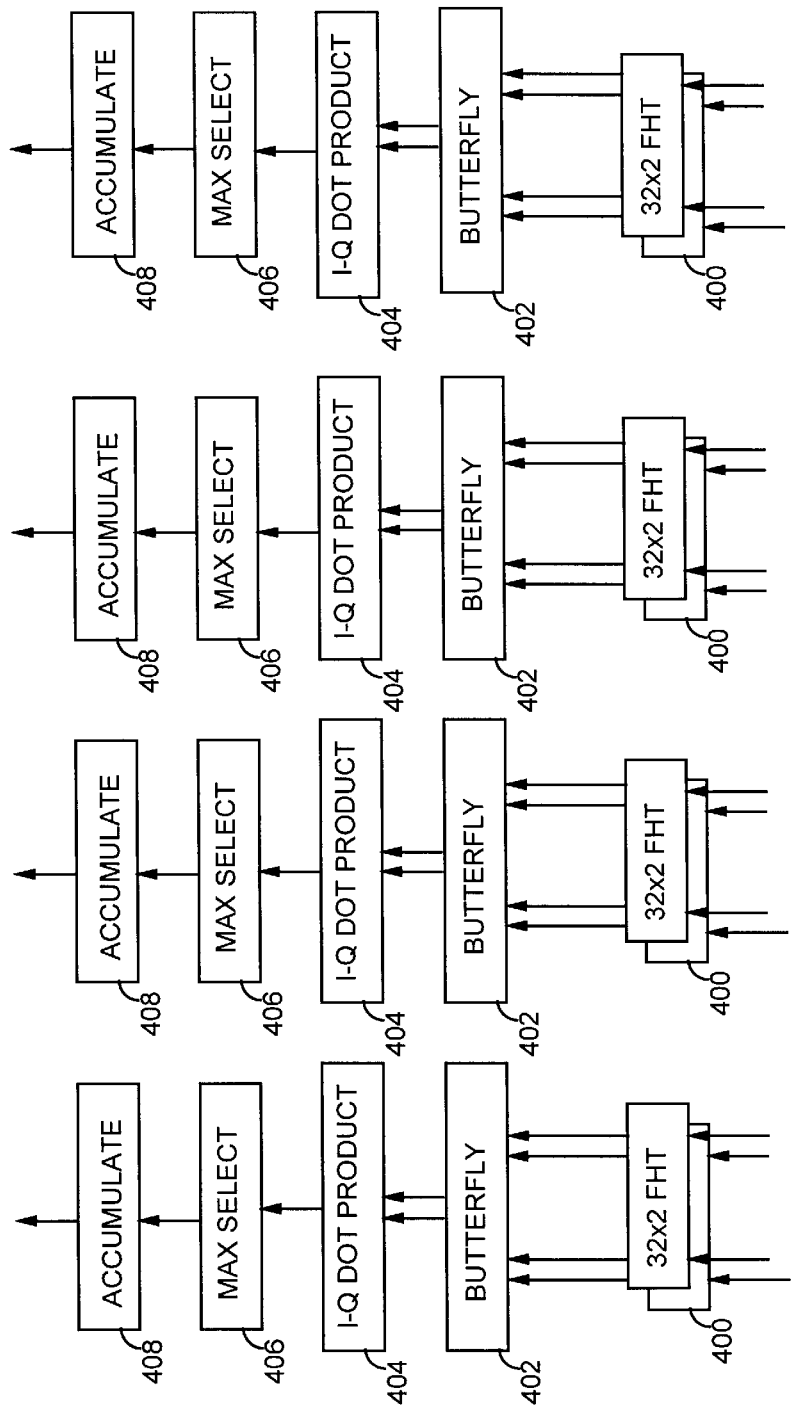
FIG. 8 is a block diagram of the searcher FHT bank when configured in accordance with one embodiment of the invention.

FIG. 8 is a block diagram of searcher FHT bank 132 when configured in accordance with one embodiment of the invention. For each offset being processed, 32×2 FHT pair 400 receives early despread data and performs fast Hadamard transforms on the in-phase (I) and quadrature-phase (Q) components. The output of 32×2 FHT pair 400 is processed by add-subtract butterfly combiners 402 which combines the output from the even and odd samples in an alternating adding-subtracting manner yielding an I correlation vector and a Q correlation vector. I-Q dot products 404 generates the dot product of the I and Q correlation vectors for each offset yielding a set of correlation energy vectors. Max select circuits select the maximum energy correlation value from each energy correlation vector, and accumulators 408 accumulate the energy correlation value over a set of Walsh symbols. Preferably, accumulators 408 accumulate the energy correlation values of a set of six Walsh symbols, which corresponds to a power control group. The use of six Walsh symbol allows enough energy to accumulate to detect a reverse link signal with a sufficiently high probability, while also allowing a sufficient number of searches to be performed to properly detect enough of the reverse link signals being received. The outputs of accumulators 410 are forwarded to searcher result RAM 134.

Figure 9:
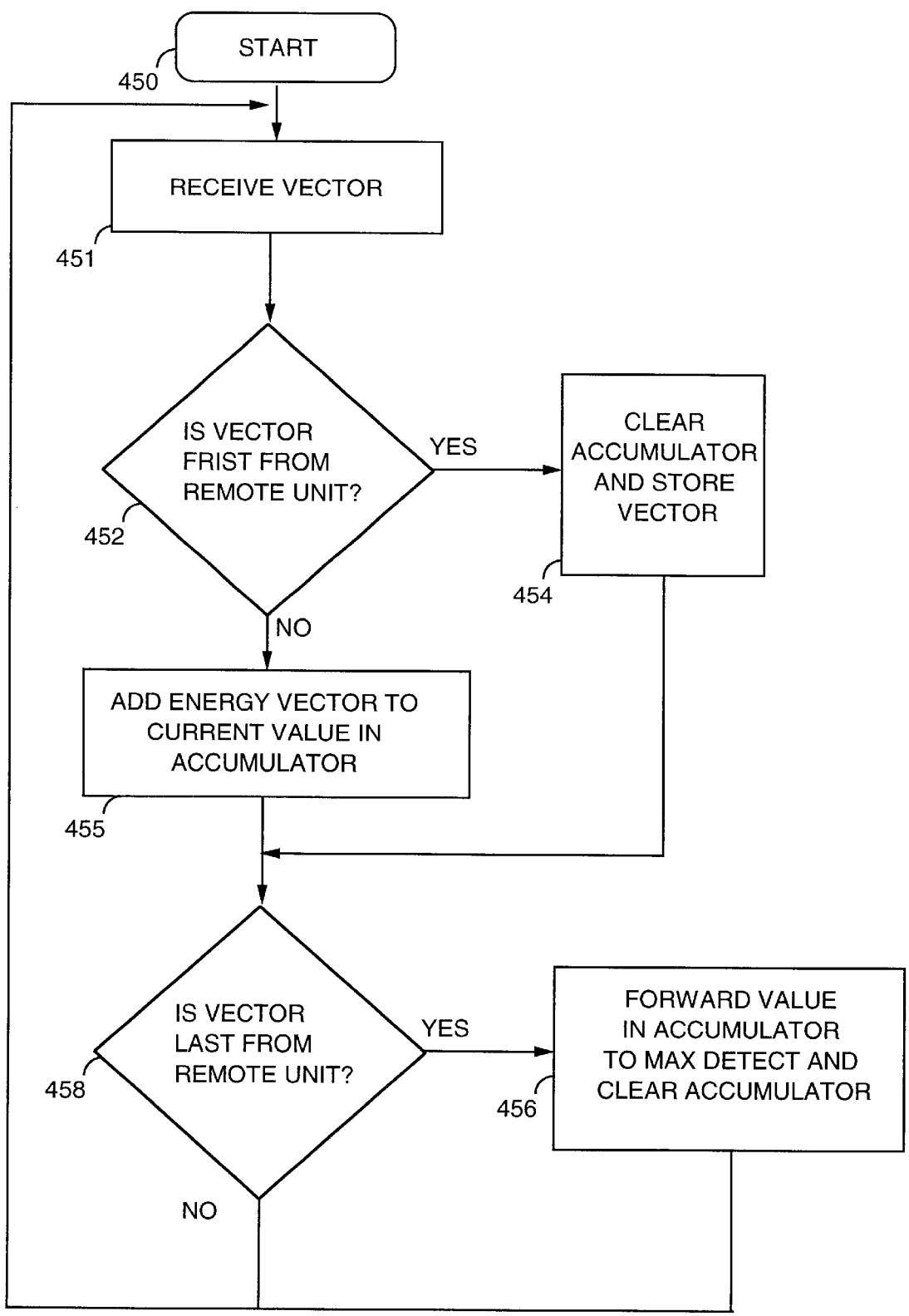
FIG. 9 is a flow chart of the steps performed during the accumulation phase of the on-time demodulation when performed in accordance with one embodiment of the invention.

Returning now to the demodulation process, FIG. 9 is a flow diagram of the steps performed during the accumulation phase of the on-time demodulation within demod FHT bank 116 (FIG. 4) in accordance with one embodiment of the invention. The processing begins at step 450 and at step 451 a vector of energy correlation values from the FHT is received. At step 452 it is determined whether the incoming energy vector is the first received from a particular mobile unit 10. If so, accumulator 306 (FIG. 6) is cleared and the vectors stored in the now cleared accumulator. If not, the energy vector is added to the energy vector presently stored in accumulator 306 at step 455. At step 455 it is further determined whether the vector being processed in the last vector from a particular mobile unit 10. If not, step 451 is performed again. If so, the value stored in the accumulator is forwarded to the max detect circuit at step 456 and step 451 is performed again.

Figure 10:
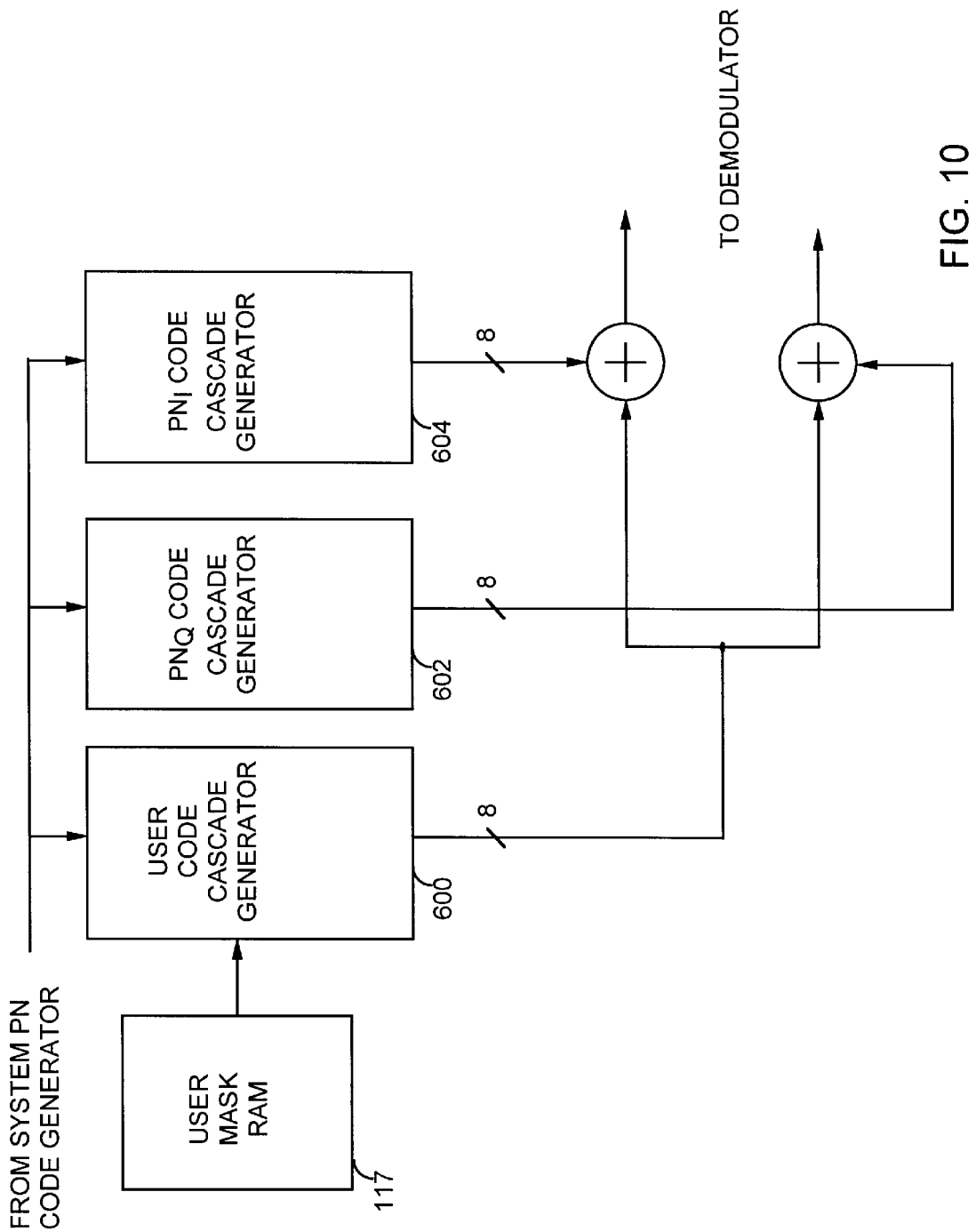
FIG. 10 is a block diagram of the demod PN code generator when configured in accordance with one embodiment of the invention.

FIG. 10 is a block diagram of demod PN code generator 114 when configured in accordance with one embodiment of the invention. In-phase spreading code (PNI) cascade generator 600, quadrature-phase spreading code (PNQ) cascade generator 602 and user code cascade generator 604 each receive start state information from control system 110. The start state information preferably the system time at which the processing of a particular reverse link should begin given the form of a 42 bit number at used in the IS-95 standard. The start state is preferable provided once every 256 spreading chips, or once every Walsh symbol.

Using the start state, cascade generators 600 and 602 each generate eight (8) spreading code chips per clock cycle. Additionally, cascade generator 604 generates eight (8) bits of user code per clock cycle using the start state and the corresponding user mask from user mask RAM 117. The user code is XORed with the in-phase and quadrature-phase spreading codes, and the resulting combined codes are forwarded to demodulator 112.

Searcher PN code generator 136 preferably operates in an similar manner to demod PN code generator 114, except that the start states and mask codes used are different as the particular reverse link signal being searched for at any given time will not necessarily be the same as the reverse link signal being demodulated.

Figure 11:
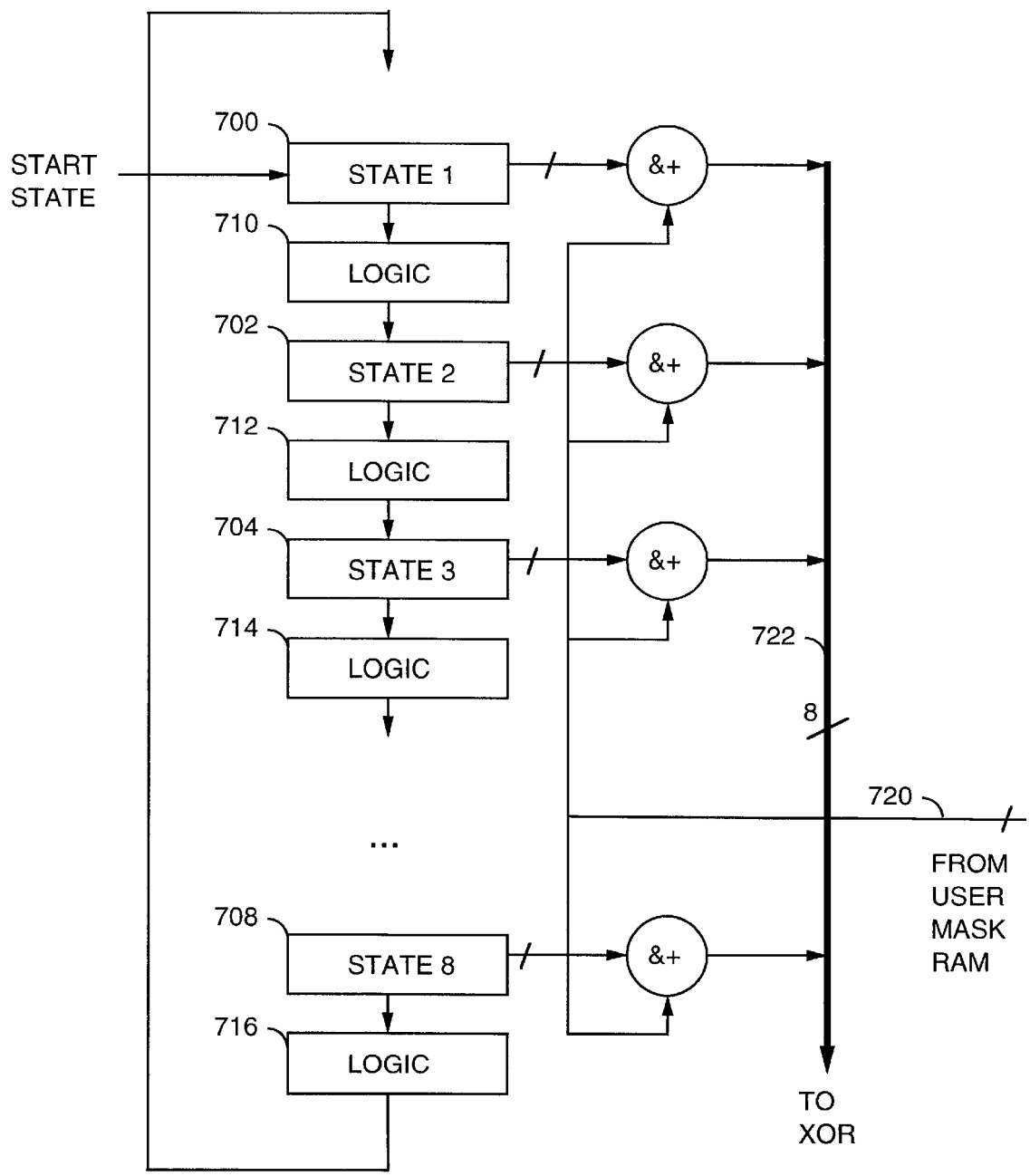
FIG. 11 is a block diagram of a PN code cascade generator when configured in accordance with one embodiment of the invention.

FIG. 11 is a block diagram of user code cascade generator 604 when configured in accordance with one embodiment of the invention. State 1 register 700 receives the start state from control system 110 and applies it to logic circuitry 710. Logic circuitry 710 performs the logical operations necessary to generate the next state in accordance with the IS-95 standard, and thus the state of the system code advanced by one spreading chip, which is stored in state 2 register 702. A system and method for formatting data substantially in accordance with the IS-95 standard is described in U.S. Pat. No. 5,504,773 entitled "Method and Apparatus for the Formatting of data for transmission" assigned to the assignee of the present invention and incorporate herein by reference.

Logic circuitry 712–716 and state registers 704–708 similarly calculate and store system time advanced by one spreading code chip with respect to the previous state register, with the output of logic circuitry 716 applied to the input of state 1 register 700. Thus, once eight states are calculated the next eight states can be calculated by latching the output of logic circuitry 716 into state 1 register 700. Cascade generators calculating fewer or greater numbers of registers may be used. Additionally, the spreading code may be calculated by using more rapid clock rate, however, the use of the cascade generator is preferred as it reduced power consumption. Those skilled in the art will recognize alternative methods for calculating the spreading codes.

The outputs of state registers 700–708 are also ANDed XORed with the user mask 722 from the user mask RAM corresponding to the mobile unit 10 being demodulated and the resulting number XORed to one bit. The resulting eight bits form theyielding the eight bit user code segment 722. The eight bit user code segment 722 is then output for additional XORing with the in-phase and quadrature phase spreading codes as described above. The in-phase and quadrature-phase spreading code cascade generators 600 and 602 operate in a similar manner to user code cascade generator 604, but do not use the user code mask and user different sizes state registers and different logic circuitry as specified by the IS-95 standard.

Figure 12:
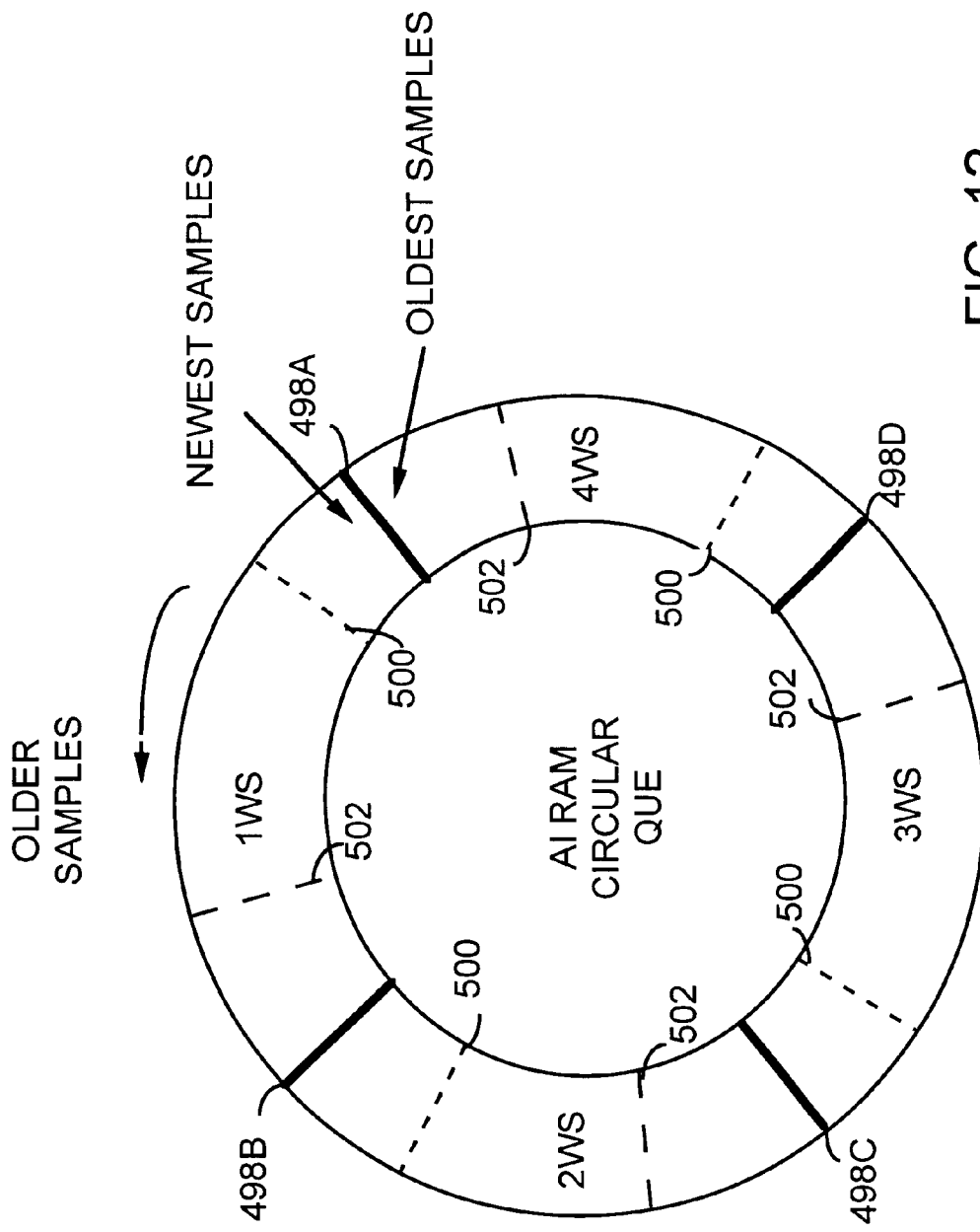
FIG. 12 is a block diagram of the structure of the antenna interface RAM queue when configured in accordance with one embodiment of the invention.

FIG. 12 is a diagram of the virtual structure of circular buffer RAM queue when configured in accordance with one embodiment of the invention. The queue is configured in a circular arrangement whereby the newest samples are written over the oldest. samples. The capacity of the queue is sufficient to store four (4) Walsh symbols of both I and Q digital samples marked 1WS–4WS. The newest samples begin at line 498A, and lines 498B–D each demarcate one Walsh symbol worth of samples. Other reverse link signals are stored within the four Walsh symbols worth of data, with the Walsh symbol boundaries for those reverse link signals occurring at different time offsets depending on the particular arrival time of that reverse link signal. For examples, lines 500 demarcate the Walsh symbol boundaries for a first reverse link signal and lines 502 demarcate the Walsh symbol boundaries for a second reverse link signal.

As is apparent, some Walsh symbols for some reverse link signals are not stored completely within the circular buffer RAM queue. A partially stored Walsh symbol is not demodulated correctly. However, storing four Walsh symbols worth of samples ensures that at least two complete Walsh symbols of samples will be stored for each reverse link signal. OftenIn some instances, three Walsh symbols may be demodulated over the curricular buffer RAM via pipelining, whereby the start of a Walsh symbol is demodulated just before it is over written.

Two complete Walsh symbols corresponds to the maximum likely difference in offset incurred from between a transmission from the edge of the coverage area, and a transmission from next to the base station. Two complete Walsh symbols also corresponds to the maximum likely offset between a direct path transmission of a particular reverse link signal and another reflected multipath component of that reverse link signal for generally accepted cell size. Thus, reverse link signals transmitted at the same system time will be simultaneously stored within circular buffer RAM, although at different memory locations, even if they were transmitted at from different locations within the coverage area of the base station. Larger cell sizes can be accommodated by increasing the size of the circular buffer RAM. Additionally, the use of a six Walsh symbol circular buffer RAM is useful for performing coherent demodulation which typically requires some degree of recursive demodulation and therefore more processing time. The use of an eight Walsh symbol circular buffer RAM is useful for data assisted, or noncausal, demodulation which involves searching for known data and also uses recursive processing.

Referring again to FIG. 4, during operation control system 110 tracks system time at the base station of the most recent samples stored in circular buffer RAM. Additionally, control system 110 tracks the offset, or delay, of each reverse link signal currently known and being processed by demodulator 112. Using the offset, control system 110 calculates the memory address location within circular buffer RAM of the next set of samples to be processed for each reverse link signal, and provides that start address to demodulator 112. Additionally, control system 110 provides demod PN code generator with the set of reverse link signals for which PN codes should be generated. Demodulator 112 then retrieves the memory from circular buffer RAM at the offset specified, and applies the PN spreading code from demod PN spreading code generator 114 in at the specified offset using data select 202 of FIG. 4.

Similarly, control system 110 calculates which reverse link signals to search for and at what offsets. The calculations are preferably in response to in internal search algorithm, and in response to control data received from base station controller 14 of FIG. 1 notifying the base station the a particular mobile unit 10 is entering the coverage area of that base station. This notification includes identification information about the mobile unit which allows the PN codes to be generated.

Control system 110 then calculates the memory address location and provides those memory address locations to searcher 130. Additionally, control system provides searcher PN code generator 136 with the identity of the user for which FN codes should be generated. As each new spreading chip worth of samples is received, searcher retrieves samples from circular buffer RAM beginning with, or containing, the specified address locations from control system 110 and applies the PN codes from searcher PN code generator 136.

In one embodiment of the invention, control system 110 considers two factors when calculating which reverse link signals to search for at any given time, although additional factor may also be considered. First, control system 110 determines if the power control group of a particular reverse link signal is in the "worthy" group. That is, control system 110 determines whether the current power control group would be transmitted for an eighth rate frame. If so, it can be assured that the reverse link signal is being transmitted and received at this time no matter what the rate the mobile has chosen, and therefore is available for detection. In the preferred embodiment of the invention, the worthy power control groups are known to the base station based on the a predetermined algorithm set forth in the IS-95 standard. Additionally, a system and method for transmitting data substantially in accordance with the IS-95 standard is described in U.S. Pat. No. 5,659,569 entitled "Data Burst Randomizer" assigned to the assignee of the present invention and incorporated herein by reference.

For those mobile units currently transmitting a worthy power control group, control system 110 then determines which reverse link signals have gone the longest period of time without a search being conducted. Control system 110 further determines the number of searches that can be performed given the capacity of searcher 130, and requests searches for as many of the set of reverse link signals which have gone the longest without a search up to the available capacity. Additionally, control system 110 requests that searches be performed for access channel transmissions during each power control group, over which requests to initiate communications are made. The access channel is simply the normal reverse link signal generated with a publicly known access long code that is the same for all the mobile units 10, rather than the private user code (PNU) generated with the user mask.

Figure 13:
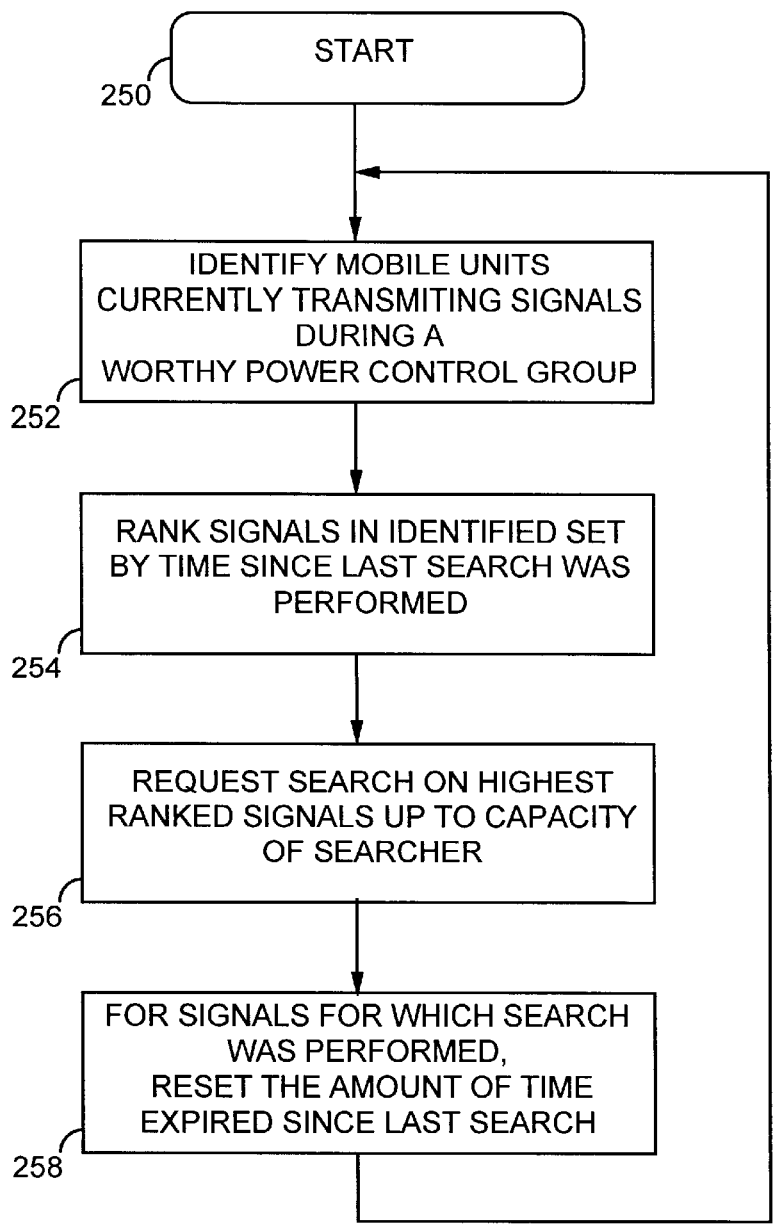
FIG. 13 is a flow diagram of the steps performed during a search when performed in accordance with one embodiment of the invention.

FIG. 13 is a flow diagram of the steps performed during a search in accordance with one embodiment of the invention. The search begins at step 250 and at step 252 the mobile units 10 being received during a worthy power control group are identified at the worthy signals. At step 254 the worthy signals are ranked by the time since the last search was performed for that signal, and at step 256 searches are requested for a set of worthy signals for which the greatest amount of time has expired since the last search up to the maximum capacity of the searcher. Once the searches have been requested, the time since a last search was performed for each reverse link signal is updated, and the search terminates at step 258. In the preferred embodiment of the invention, searches are performed repeatedly during normal operation in an ongoing manner.

FIG. 14 is a block diagram of a time tracking unit 119 when configured in accordance with one embodiment of the invention. Delay/demux FIFO 550 receives early and late despread data from demodulator 112 and stores up to six different occurrences (fingers) of the same reverse link signal to in registers F1–F6 within delay/demux FIFO 550. If fewer than six multipaths are being demodulated all the registers F1–F6 will not contain data. The even and odd portions of the both the early and late data are demultiplexed into single data streams for each finger, and the demultiplexed streams are fed to decover circuits 552. Decover circuits 552 also receive the Walsh index of the selected Walsh symbol.

When Using the Walsh index becomes available, decover circuits 552 begin to decover, or demodulate, in serial fashion the early. and late despread data stored in those registers F1–F6 that contain data with the Walsh symbol that corresponds to the Walsh index, yielding in-phase and quadrature phase early and late demodulation data for each finger. The in-phase and quadrature phase early and late demodulation data for each finger is fed to I-Q dot product circuits 554 which generate the magnitude computationdot product of the in-phase and quadrature phase data yielding early and late energy values for each finger. Compare circuits 508 indicate whether the early or late processing for each finger produced the greatest energy level, and forward that indication to control system 110.

Control system 110 responds to the indication data from compare circuits 508 by incrementing or decrementing a time tracking reside buffer by the offset of the associated finger, and therefore contributing to the ½,000 the duration of a spreading code chip for each demodulation operation, and advancing or retarding the processing of the associated finger. when the value in the time tracking buffer changes by one-eighth the duration of a spreading chip as described above. As should be apparent, the fingers are processed separately because the offset for each finger changes independently. However, by delaying the processing of each finger while the on-time correlation vectors can be combined, the most likely Walsh symbol can be selected using the energy from all the fingers, thus increasing the likelihood of a correct selection.

Thus, a system and method for processing a plurality of signals, and preferably CDMA signals, that can be implemented a single, or reduced, number of integrated circuits has been described. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A system for demodulating a set of CDMA signals, each signal having one or more multipath instances comprising:

antenna input memory for storing digital samples of radio frequency energy;

searcher for demodulating said digital samples at a first set of time offsets;

demodulator for demodulating said digital samples at a second set of offsets;

a control system for specifying said first set of time offsets and said second set of time offsets, wherein said demodulator is further for retrieving a first set of samples from said antenna input memory; and demodulating said first set of samples with a first PN code applied at an offset from said first set of offsets.

2. The system as set forth in claim 1 wherein said searcher is further for:

retrieving a second set of samples from said antenna input memory; and demodulating said second set of samples with a second PN code applied at an offset from said second set of offsets.

3. The system as set forth in claim 1 wherein:

said demodulator is further for demodulating at offsets for which signals have already been detected; and said searcher is further for demodulating at offsets for which it is unknown if a signal is being received.

4. The system as set forth in claim 1 wherein said second set of offsets changes more rapidly than said first set of offsets.

5. The system as set forth in claim 1 wherein said first set of offsets has fewer members than said second set of offsets.

6. The system of claim 1 further comprising:

demod PN code generator for generating a first set of PN codes for demodulating said digital samples at said first set of offsets; and search PN code generator for generating a second set of PN codes for demodulating at said digital samples at said second set of offsets.

7. The system of claim 1 wherein said antenna input memory stores said digital samples in a circular queue arrangnment.

8. The system of claim 1 wherein said antenna input memory stores approximately four Walsh symbols worth of digital samples.

9. The system as set forth in claim 1 further comprising a time tracking unit for indicating whether a time offset in said first set of offsets should be advanced or retarded.

10. A method for demodulating a set of CDMA signals, each signal having one or more multipath instances comprising the steps of:

storing digital samples of radio frequency energy in antenna input memory:

retrieving a first set of samples from said antenna input memory;

demodulating said digital samples at a first set of time offsets;

demodulating said digital samples at a second set of offsets; and demodulating said first set of samples with a first PN code applied at an offset from said first set of offsets.

11. The method as set forth in claim 10 further comprising the steps of:

retrieving a second set of samples from said antenna input memory; and demodulating said second set of samples with a second PN code applied at an offset from said second set of offsets.

12. The method as set forth in claim 10 wherein said first set of offsets are for signals have already been detected; and said second set of offsets is for which signals have not been detected.

13. The method as set forth in claim 10 wherein said second set of offsets changes more rapidly than said first set of offsets.

14. The method as set forth in claim 10 wherein said first set of offsets has fewer members than said second set of offsets.

15. The method of claim 10 further comprising the steps of:

generating a first set of PN codes for demodulating said digital samples at said first set of time offsets; and generating a second set of PN codes for demodulating at said digital samples at said second set of time offsets.

16. The method of claim 1 wherein said digital samples are stored in a circular queue arrangnment.

17. The method of claim 1 wherein approximately four Walsh symbols worth of digital samples are stored.

18. The method as set forth in claim 10 further comprising the step of indicating whether a time offset in said first set of offsets should be advanced or retarded.

* * * * *